2,941,954
ACTIVATION OF HYDROGENATION CATALYSTS

John B. Wilkes, Albany, Calif., assignor to California Research Corporation, San Francisco, Calif., a corporation of Delaware No Drawing. Filed Dec. 23, 1957, Ser. No. 704,244

1 Claim. (Cl. 252—416)

This invention relates to a method of activating sulfur-containing, low activity hydrogenation catalysts and, more particularly, to a method of activating cobalt and/or nickel metallic hydrogenation catalysts which have been poisoned or otherwise rendered inactive by sulfur.

It has long been known that cobalt and nickel, or mixtures thereof, have valuable properties as non-destructive hydrogenation catalysts and are useful in the hydrogenation of various organic compounds. For example, such catalysts find rather extensive industrial use in the low temperature, high pressure hydrogenation of adiponitrile to hexamethylenediamine and phthalonitriles to xylylenediamines. However, one of the major problems affecting all of these hydrogenation reactions is the poisoning effect that sulfur has upon the hydrogenation catalyst resulting in rapid deactivation.

The usual approach to alleviating this sulfur poisoning is to pretreat the feed stocks to remove any sulfur present. Since spent hydrogenating catalysts can still remove sulfur compounds, they are often used in such a pretreating operation. However, any pretreatment of feed stocks involves not only additional equipment with attendant additional cost and accordingly, would be desirable to eliminate from the processing scheme, but also, complete removal of the sulfur compounds is not economically feasible. Therefore, many attempts have been made to reactivate hydrogenating catalysts, as by reduction with or without oxidation, but all such attempts heretofore have failed or have been only partially successful. Due to this lack of success on reactivation, the usual procedure is to dissolve the spent catalyst in acid and reprecipitate it in a purified form for reuse.

It has now been found that inactive cobalt and/or nickel containing hydrogenating catalysts that may have been rendered inactive by sulfur poisoning, as distinguished from deactivation due to the deposition of carbonaceous material thereon, can be effectively reactivated to an activity either commensurate with or higher than that of fresh or sulfur-free catalyst. Such reactivation can be accomplished by heating the catlyst in the presence of an oxygen-containing gas under critical temperature conditions for a period of at least about one hour. Thus, it has been found that if the heating operation is conducted at temperatures of from about 1200° to 1750° F., and preferably from about 1350 to 1600° F., that essentially complete reactivation of these particular hydrogenation catalysts results.

The reactivation operation of the present invention is applicable to metallic cobalt and nickel (or combinations thereof) hydrogenation catalysts and is preferably employed in the activation of promoted (as by silica and the like) or unpromoted unsupported catalysts such as Raney nickel and cobalt, pelleted cobalt and pelleted combinations of nickel and cobalt, and reduced sintered cobalt and nickel oxides.

The activation reaction itself is conducted in the presence of an oxygen-containing gas, preferably air, at a temperature in the range of from about 1200° to 1750° F. A more preferred temperature range is that from about 1350° to 1600° F. It has been found that activation temperatures below about 1200° F. are essentially ineffective even though extensive periods of contact time are employed. At temperatures above about 1775° to 1800° F., and this is particularly true in the case of cobalt-containing catalysts, disintegration of the catalyst occurs rendering it unsuitable for use. The most preferable activation temperature, for cobalt, nickel and combinations thereof, lies in the range of from about 1350° to 1600° F., since it has been found that at these temperatures the catalyst attains a strength, reflected in its attrition resistance, greater than that obtainable from any other activation temperature or manner. The oxidation step is conducted for a period of at least one hour, the optimum period depending, of course, upon the amount of sulfur present on the catalyst and the oxidation temperature employed. Thus, when employing oxidation temperatures at the upper end of the specified range, as, for example, 1600° to 1750° F., less contact time with the oxygen-containing gas is necessary than when temperatures of 1200° to 1300° F. are employed. Even when the higher temperature portions of the 1200° to 1750° F. range are used, contact times in excess of one hour are necessary when activating catalysts having comparatively high sulfur contents. There appears to be no upper limit on oxidation periods except those imposed by costs and convenience, since periods in excess of 48 hours have been employed with salutory results.

A further aspect of the temperature-time relationship of the oxidation step is the fact that the activity of a sulfur poisoned catalyst can be restored to that commensurate with fresh, unsullied catalyst by only removing a relatively small proportion of the sulfur initially present. Thus, it has been found that by oxidizing a poisoned pelleted cobalt catalyst at 1200° F. for 5 hours, the catalyst regained essentially all of its activity (compared with its initial activity as a fresh catalyst) while only removing 13 percent of the sulfur in the catalyst. By contrast, when the same poisoned catalyst is oxidized at 1600° F. for 3 hours, 42 percent of the sulfur was removed, and the activity and selectivity of the catalyst was greater than in its initial fresh state. Further, when the oxidation was extended to 15 hours at 1600° F., 81 percent of the sulfur was removed, and the reactivated catalyst had a greater activity than the fresh catalyst, but it was no greater than that attained by oxidation at 1600° F. for 3 hours. These facts indicate that reactivation is not solely based upon sulfur removal, i.e., that the more sulfur removed, the more active the reactivated catalyst is. The answer probably lies in the poisoning itself, namely, that the sulfur permeates the entire catalyst and that oxidation reaction initiates on the catalyst periphery, removing the sulfur from the outer surface of the metal sulfide leaving a sulfur-free, active crust.

Although the actual mechanism of the activation step is not positively known, it is believed that the process involves air oxidation of the metal sulfide to the sulfate and thermal decomposition of the sulfate to sulfur trioxide and the metal oxide. The latter is then reduced to the metal by conventional means, as, for example, by contacting the oxide with hydrogen at a temperature of from about 700° to 800° F. No criticality exists in the reducing step so long as the oxide is reduced to the metal in the absence of temperatures that would cause sintering.

The activation process of the present invention can be practiced in any equipment capable of contacting the catalyst with an oxygen-containing gas at temperatures up to about 1750° F., since no criticality exists in the actual manner of conducting the operation within the specified limits of temperature and time. The oxidation step can, of course, be conducted in situ, i.e., in the hydrogenation reactor itself. In this manner, catalyst handling and process equipment art at a minimum.

The catalyst activation process of the present invention, as applied to various catalysts employed in the hydrogenation of isophthalonitrile to metaxylylenediamine, is shown in the following examples. Unless otherwise noted, all of the hydrogenation reactions described in the examples were conducted at a temperature of 250° F. and a pressure of 3000 p.s.i.g.

EXAMPLE 1

A pelleted cobalt hydrogenation catalyst, made by pelleting and sintering cobalt oxide at 1600° F., followed by reduction with hydrogen at a temperature of from 750° to 800° F., was employed in the continuous fixed-bed hydrogenation of isophthalonitrile in a xylene solution and in the presence of ammonia. The catalyst was kept onstream until it was essentially inactive due to sulfur poisoning. Samples of the poisoned catalyst were then subjected to air oxidation in a muffle furnace at various temperatures and contact times and then tested for isophthalonitrile hydrogenation in batch autoclaves under the same conditions as those employed in the initial reaction using fresh catalyst. The results are given in the table below. The rate refers to the grams of isophthalonitrile hydrogenated per cc. of catalyst per hour. The terms IPN and MXDA refer to isophthalonitrile and metaxylylenediamine, respectively. Run 1 is on fresh catalyst with all subsequent runs on poisoned catalyst.

Table

| Run No. | Activation | | | | Hydrogenation | | |
|---|---|---|---|---|---|---|---|
| | Temp., °F. | Time, Hrs. | Sulfur, Wt. Percent | | Sulfur Removal Wt. Percent | Rate, gm. IPN/cc./ Hr. | Weight Ratios, IPN:Xylene: NH$_3$ | MXDA Yield, Percent |
| | | | Initial | Final | | | | |
| 1 | None | (New Catalyst). | | | | 1.55 | 27:54:18.4 | 93.2 |
| 2 | 600 | 3 | 0.177 | 0.177 | 0 | .0 | 26:42:32 | 0 |
| 3 | 1,200 | 5 | 0.177 | 0.155 | 12.5 | 2.1 | 26:45:29 | 91.1 |
| 4 | 1,600 | 1.5 | 0.177 | | | 3.2 | 25:44:31 | 91.5 |
| 5 | 1,600 | 3 | 0.177 | 0.102 | 42.5 | 2.4 | 26:46:28 | 92.7 |
| 6 | 1,600 | 15 | 0.177 | 0.034 | 81.0 | 2.8 | 26:45:29 | 93.8 |
| 7 | 1,600 | 15 | 0.177 | 0.034 | 81.0 | 2.6 | 20:37:43 | 95.6 |
| 8 | 1,200 | 25 | 0.32 | 0.25 | 22.0 | 3.9 | 25:47:28 | 94.8 |

From the results indicated on the table it can be seen that reactivation of spent cobalt hydrogenation catalysts can be accomplished to a point commensurate in scope to fresh catalyst by observing the limitations of temperature and time hereinbefore discussed. Several other features are brought out by these data. One such point is that reactivation can be obtained even though very little sulfur is removed. Thus, the poisoned catalyst is reactivated to a high degree by only removing 12.5 percent of the sulfur initially present (run 3). Another feature is that increased metaxylylenediamine yields can be had on reactivated catalyst by increasing the ratio of ammonia to isophthalonitrile in the xylene solution that constitutes the feed to the hydrogenation zone. This is shown in runs 6 and 7. It will be noted that the ratio of NH$_3$:IPN in run 6 is about 1:1 and a yield of MXDA of 93.8 percent is obtained. When the ratio is increased to about 2:1, the MXDA yield goes up to 95.6 percent. Accordingly, it is preferred to employ higher NH$_3$:IPN ratios with activated catalyst than in the case when fresh catalyst is used.

EXAMPLE 2

An unsupported nickel hydrogenation catalyst was made from technical green nickel oxide by pelleting and sintering at 1600° F. and thereafter reducing with hydrogen at 800° F. The catalyst was employed in an IPN hydrogenation run at 250° F. and 3000 p.s.i.g., for a reaction time of 160 minutes. The feed was composed of 25 parts by weight of isophthalonitrile, 45 parts per weight of xylene and 30 parts per weight of ammonia. A metaxylylenediamine yield of 79 percent was realized. The catalyst was then poisoned with ammonia sulfide. The sulfur content of the catalyst was 0.291 weight percent. A sample of this poisoned catalyst was then oxidized in the presence of air in a heated tube for several hours at a temperature of from 900° to 950° F. Essentially no sulfur was removed by this oxidation, and the reduced catalyst, upon being employed under identical hydrogenation conditions as the fresh catalyst, yielded essentially no metaxylylenediamine. The poisoned catalyst was then oxidized for 18 hours at 1550° F. The sulfur content was reduced from 0.291 weight percent to 0.017 percent, which amounted to approximately 96 percent. This latter catalyst, after reduction with hydrogen at 800° F., was then employed to hydrogenate IPN under the identical conditions employed with the fresh catalyst except that the reaction time was 120 minutes. An MXDA yield of 83.2 percent was realized. Thus, under essentially the same hydrogenation conditions, the activated catalyst gave over 4 percent better MXDA yield than the fresh, new catalyst.

EXAMPLE 3

A cobalt catalyst was prepared from cobalt oxide by reacting reagent grade cobalt nitrate and ammonium carbonate promoted with silica, decomposing the resulting cobalt carbonate to the oxide, and thereafter pelleting, sintering and reducing with hydrogen. The resulting pelleted catalyst was extremely poor in attrition resistance. Using the catalyst for isophthalonitrile hydrogenation at 250° F., 3000 p.s.i.g., and a reaction time of 65 minutes resulted in a metaxylylenediamine yield of 90.7 percent. The feed was composed of 25 parts by weight of IPN, 44 parts by weight of xylene, and 31 parts by weight of NH$_3$. The catalyst was then poisoned with sulfur (0.057 percent by weight) and subjected to air oxidation at 1550° F. for 22 hours. The oxidation step reduced the sulfur content 52.5 percent. A feed composed of 26 parts by weight IPN, 45 parts by weight xylene, and 29 parts by weight NH$_3$ was then hydrogenated over the reactivated catalyst for 64 minutes. The MXDA yield amounted to 91.2 percent, which was greater than that obtained by hydrogenating with the fresh catalyst.

EXAMPLE 4

Three pounds of Bakers C.P. CoSO$_4$·7H$_2$O were dissolved in 7.5 liters of water and heated, with stirring, to 85° C. Two cc. of sodium silicate were mixed with 100 cc. of water, agitated vigorously, and to this mixture was added nitric acid until the mixture attained a pH of 3. This mixture was then added to the cobalt sulfate solution. Ammonium carbonate was added slowly to the CoSO$_4$ solution until a precipitate formed that did not re-dissolved (329 grams). Then 590 grams more of ammonium carbonate were added to the CoSO$_4$ solution and digested 30 minutes at 80–85° C. The solution was then filtered and the recovered precipitate was reslurried twice with 7–8 liters of water, and again filtered. The recovered filter cake was then dried on a steamplate, and further dried in a muffle furnace for 3 hours at 400° F. The cake was then ignited 3 hours at 800° F. to decompose the carbonate to the oxide (374 grams). The oxide was then granulated by adding water plus 3.7 grams of sucrose and dried. The cake was then ground to pass a 20-mesh screen, mixed with a lubricant (3% "Sterotex") and pelleted to ¼-inch pellets. The pellets were then sintered 3 hours at 1600° F.

The catalyst was then reduced with hydrogen at 700 to 800° F. and used in the hydrogenation of isophthalonitrile at 250° F. and 3000 p.s.i.g. The catalyst was extremely inactive inasmuch as essentially no metaxylenediamine was produced. The same catalyst was then oxidized in air at 1600° F. for 7.5 hours and employed in the identical hydrogenation reaction. The catalyst was very active, having a hydrogenation rate commensurate with the fresh cobalt catalyst of Example 3 above.

I claim:

A process for the activation of inactive sulfur-containing hydrogenation catalysts, said catalysts comprising predominant amounts of cobalt, which comprises heating said catalysts in an oxygen-containing gas at a temperature of from about 1200° to about 1750° F. under conditions, including a period of at least one hour, such that from 13 to 42 weight percent of the sulfur originally present has been removed from said catalysts.

References Cited in the file of this patent

UNITED STATES PATENTS

| | | |
|---|---|---|
| 1,915,362 | Hanks et al. | June 27, 1933 |
| 2,220,849 | Riblett | Nov. 5, 1940 |
| 2,455,419 | Johnson | Dec. 7, 1948 |